(12) United States Patent
Guo et al.

(10) Patent No.: US 8,111,756 B2
(45) Date of Patent: Feb. 7, 2012

(54) METHOD FOR REDUCING COMPUTATIONAL COMPLEXITY OF VIDEO COMPRESSION STANDARD

(75) Inventors: Jiun-In Guo, Chia-Yi (TW);
Jinn-Shyan Wang, Chia-Yi (TW);
Jia-Wei Chen, Chia-Yi (TW);
Chun-Hao Chang, Chia-Yi (TW);
Yi-Huan Ou Yang, Chia-Yi (TW);
Chien-Chang Lin, Kaohshiung (TW)

(73) Assignee: Jiun-In Guo, Chia-Yi (TW)

( * ) Notice: Subject to any disclaimer, the term of this patent is extended or adjusted under 35 U.S.C. 154(b) by 1526 days.

(21) Appl. No.: 11/512,287

(22) Filed: Aug. 30, 2006

(65) Prior Publication Data

US 2008/0056355 A1 Mar. 6, 2008

(51) Int. Cl.
*H04N 7/12* (2006.01)
(52) U.S. Cl. .................................. 375/240.24
(58) Field of Classification Search ............... 375/240.12
See application file for complete search history.

(56) References Cited

U.S. PATENT DOCUMENTS

| | | | | |
|---|---|---|---|---|
| 2003/0223645 | A1* | 12/2003 | Sun et al. | 382/239 |
| 2004/0240556 | A1* | 12/2004 | Winger et al. | 375/240.18 |
| 2006/0165171 | A1* | 7/2006 | Cha et al. | 375/240.12 |

FOREIGN PATENT DOCUMENTS

WO WO 2004080084 A1 * 9/2004

OTHER PUBLICATIONS

Suh, Park & Cho, "An Efficietn Hardware Architecture of Intra Prediction and TQ/IQIT Module for H.264 Encoder", ETRI Journal, vol. 27, No. 5, Oct. 2005, 511-524.*
Chen, Chang, Lin, Yang, Guo, & Wang, "A Condition-based Intra Prediction Algorithm for H.264/AVC", 2006 IEEE International Conference on Multimedia and Expo, Issue Date: Jul. 9-12, 2006, pp. 1077-1080.*

* cited by examiner

*Primary Examiner* — Young Lee
*Assistant Examiner* — Brent R Lindon
(74) *Attorney, Agent, or Firm* — Rosenberg, Klein & Lee

(57) ABSTRACT

A method for reducing computational complexity of video compression standard is provided, and it includes an intra 4×4 macroblock (I4MB) search algorithm, an intra 16×16 macroblock (I16MB) search algorithm and a chroma search algorithm. The I4MB search algorithm and I16MB search algorithm accelerate the prediction process of the luma macroblock, and the chroma search algorithm accelerates the prediction process of chroma macroblock. The above algorithms can greatly reduce the computation of prediction mode of video compression standard.

14 Claims, 6 Drawing Sheets

| Half-full search | | | |
|---|---|---|---|
| | | Upper Block (Available) | |
| | | DC | Other Prediction mode |
| Left Block (Available) | DC | 0,1,2,3,4 | 0,1,2,3,4 |
| | Other Prediction mode | 0,1,2,3,4 | Context-correlation search |

| Condition-correlation search | | Upper Block | |
|---|---|---|---|
| | | Non Available | Available |
| Left Block | Non Available | | 0,2,3,7 |
| | Available | 2 | Half-full search and Context-correlation search |
| | | 1,2,8 | |

Figure 1a

| Half-full search | Upper Block (Available) | | |
|---|---|---|---|
| | | DC | Other Prediction mode |
| Left Block (Available) | DC | 0,1,2,3,4 | 0,1,2,3,4 |
| | Other Prediction mode | 0,1,2,3,4 | Context-correlation search |

| B/A | Unavailable | 0 | 1 | 2 | 3 | 4 | 5 | 6 | 7 | 8 |
|---|---|---|---|---|---|---|---|---|---|---|
| Unavailable | 2 | 2037 | 2037 | 2037 | 2037 | 2037 | 2037 | 2037 | 2037 | 2037 |
| 0 | 281 | 2057 | 2057168 | 01234 | 23705 | 205746 | 20574 | 2057614 | 20573 | 205781 |
| 1 | 281 | 2057168 | 2168 | 01234 | 237168 | 246518 | 2540168 | 26148 | 2703168 | 2816 |
| 2 | 281 | 01234 | 01234 | 01234 | 01234 | 01234 | 01234 | 01234 | 01234 | 01234 |
| 3 | 281 | 20573 | 237168 | 01234 | 237 | 246537 | 254037 | 261437 | 2703 | 28137 |
| 4 | 281 | 205746 | 216845 | 01234 | 237465 | 2465 | 25406 | 26145 | 2703465 | 281465 |
| 5 | 281 | 20574 | 2168540 | 01234 | 237540 | 24650 | 2540 | 261450 | 270354 | 281540 |
| 6 | 281 | 2057614 | 21684 | 01234 | 237614 | 24651 | 254061 | 2614 | 2703614 | 28164 |
| 7 | 281 | 20573 | 2168703 | 01234 | 2370 | 2465703 | 254073 | 2614703 | 2703 | 281703 |
| 8 | 281 | 205781 | 2168 | 01234 | 23781 | 246581 | 254081 | 26148 | 270381 | 281 |

Figure 2

| 4x4 blk 0 | 4x4 blk 1 | 4x4 blk 2 | 4x4 blk 3 |
|---|---|---|---|
| 4x4 blk 4 | 4x4 blk 5 | 4x4 blk 6 | 4x4 blk 7 |
| 4x4 blk 8 | 4x4 blk 9 | 4x4 blk 10 | 4x4 blk 11 |
| 4x4 blk 12 | 4x4 blk 13 | 4x4 blk 14 | 4x4 blk 15 |

Figure 3a

| tr 0 | tr 1 | tr 2 | tr 3 |
|---|---|---|---|
| tr 4 | tr 5 | tr 6 | tr 7 |
| tr 8 | tr 9 | tr 10 | tr 11 |
| tr 12 | tr 13 | tr 14 | tr 15 |

Figure 3b

| 4x4 blk 0 | 4x4 blk 1 |
|---|---|
| 4x4 blk 2 | 4x4 blk 3 |

Figure 4a

| 4x4 blk 0 | 4x4 blk 1 |
|---|---|
| 4x4 blk 2 | 4x4 blk 3 |

Figure 4b

METHOD FOR REDUCING COMPUTATIONAL COMPLEXITY OF VIDEO COMPRESSION STANDARD

BACKGROUND

1. Field of Invention

The present invention relates to a method for reducing computational complexity of video compression standard, and more particularly to a spatial correlation based method for reducing computational complexity of video compression standard.

2. Description of Related Art

H.264/AVC (Advanced Video Coding) is the video compression standard established by the Joint Video Team (JVT) consisting of the Video Coding Experts Group (VCEG) of ITU-T and the Moving Picture Experts Group (MPEG) of International Organization for Standardization (ISO)/International Electrotechnical Commission (IEC). The term of H.264 is named on the basis of the series of H.26x by ITU-T, and AVC is the appellation of ISO/IEC MPEG. The final draft of first edition for this standard is admitted in May of 2003.

The initial objective of establishing H.264/AVC is to provide a higher compression rate on video quality than prior related art (such as MPEG-2 and H.263), and to diminish some complex coding/decoding implements in order to simplify the hardware. Moreover, another objective is the adaptability for the video compression standard to be used in extensive range (including the video of high bit or low bit and different video resolution), and applicable to various networks or systems (such as the multi-media mobile phone system or the high-density television) The H.264/AVC intra coding system can be divided into some primary parts including the intra prediction, the transformation and quantification (DCT/Q/IQ/IDCT), the context adaptive variable length coding (CAVLC) and the mode decision. Due to the Intra prediction needs to generate thirteen kinds of predictors for luma (Luminance) and four kinds of predictors for chroma, this parts of the intra prediction and the mode decision take almost 70% computation for intra coding during the image-frame coding process.

In order to compute minimal rate-distortion cost, each kind of predictors would do subtraction with the original pixel, be transformed by two-dimensional Hadamard and sum up the transformed factors to determine the best prediction mode. Reducing the computation of prediction mode would speed up the performance of the intra coding system but would also affect image quality. Therefore, the present invention supplies a method to reduce the computation of prediction mode with a little deterioration of image quality.

SUMMARY

It is therefore an objective of the present invention to provide a method which can accelerate macroblock prediction process of video compression standard in order to reduce luminance computation caused by video compression in unit time.

It is another objective of the present invention to provide a method which can accelerate chroma distortion prediction process of video compression standard in order to reduce chroma computation caused by video compression in unit time.

In accordance with the foregoing and other objectives of the present invention, a method which accelerates the macroblock prediction process is provided. In the preferred embodiment of the present invention, a new intra 4×4 macroblock (I4MB) search table is provided to compute all prediction modes with spatial correlation. Additionally, in the prediction modes of intra 16×16 macroblock (I16MB), curtailing the computation of separated discrete cosine (DC) factor to simplify whole prediction process.

In accordance with the foregoing and other objectives of the present invention, a method which accelerates the chroma distortion prediction process is provided. In the preferred embodiment of the present invention, computing the distortion of partial macroblock instead of computing the distortion of whole macroblock for chroma prediction in order to accelerate the chroma distortion prediction process.

The present invention proposes a series of fast algorithms for simplifying prediction process to accelerate mode decision process of luma and chroma prediction mode of video compression standard.

The simplified algorithm for prediction progress of the present invention can not only result in limited distortion but also speed up system computation.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1a illustrates a condition-correlation search mode of the intra 4×4 macroblock search algorithm of the preferred embodiment of the present invention.

FIG. 1b illustrates a half-full search mode of the condition-correlation search mode in FIG. 1a;

FIG. 1c illustrates a context-correlation search mode of the condition-correlation search mode in FIG. 1a;

FIG. 2 illustrates an intra 4×4 macroblock mode determination table of the preferred embodiment of the present invention;

FIG. 3a illustrates a luma 16×16 macroblock of the intra 16×16 macroblock search algorithm of the preferred embodiment of the present invention;

FIG. 3b illustrates a 4×4 block of the intra 16×16 macroblock search algorithm of the preferred embodiment of the present invention;

FIG. 4a illustrates a U macroblock of the chroma macroblock of the preferred embodiment of the present invention; and FIG. 4b illustrates a V macroblock of the chroma macroblock of the preferred embodiment of the present invention.

DESCRIPTION OF THE PREFERRED EMBODIMENTS

Figure 1B:
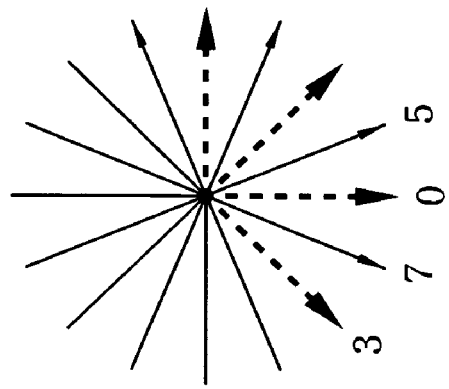

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

In H.264/AVC video compression standard, the luminance prediction mode can be divided into two different intra macroblock conditions, intra 4×4 macroblock (I4MB) and intra 16×16 macroblock (I16MB).

There are nine prediction modes in the I4MB macroblock: mode 0 (vertical), mode 1 (horizontal), mode 2 (DC), mode 3 (diagonal down-left), mode 4 (diagonal down-right), mode 5 (vertical-right), mode 6 (horizontal-down), mode 7 (vertical-left) and mode 8 (horizontal-up). Condition-correlation search table 11 is built by observing availableness of the upper and left blocks. According to the condition-correlation search table 11, the prediction mode can selectively predict some modes to reduce the computation.

Reference is made to FIG. 1a, which illustrates a condition-correlation search mode of the intra 4×4 macroblock search algorithm of the preferred embodiment of the present invention.

There are four different conditions in the condition-correlation search table in FIG. 1a: in the first condition, only mode 2 is performed when the left and upper blocks are both non available.

In the second condition, mode 1, mode 2 and mode 8 are performed when the left block is available but the upper block is non available.

In the third condition, mode 0, mode 2, mode 3 and mode 7 are performed when the left block is non available but the upper block is available.

In the fourth condition, modes of half-full search and context-correlation search are performed when the left and upper blocks are both available.

Reference is made to FIG. 1b, which illustrates a half-full search mode of the condition-correlation search mode.

The half-full search table is divided into two different conditions. In the first condition, only mode 0, mode 1, mode 2, mode 3 and mode 4 are performed when the left or upper block is mode 2 (DC) because the other modes possess their own spatial direction in the nine block prediction modes of I4MB except mode 2 (DC). Therefore, mode 2 can be separated from the nine block prediction modes of I4MB. In natural images, neighboring pixels change slightly such that each neighboring blocks are almost the same. Therefore this approach uses the spatial correlation between the blocks to select some possible block prediction modes to perform and simplify the computation. No matter what kind of prediction modes the neighboring block is, mode 2 is always possible to be the best prediction mode. If mode 2 happens in the neighboring blocks, all kinds of prediction modes are possible to be the best prediction modes because mode 2 does not possess any obvious spatial direction. Thus, all kinds of modes will be performed when mode 2 occurs in neighboring blocks. In order to reduce the computation complexity, the mode having higher occurrence probability is selected to substitute all previous modes. Therefore, the approach, wherein only mode 0, mode 1, mode 2, mode 3 and mode 4 are performed, is called as half-full search.

Figure 1C:
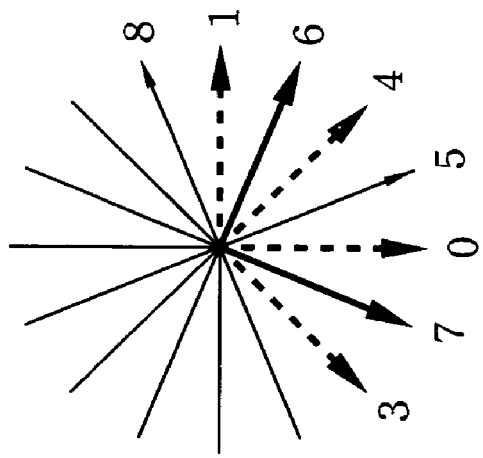
Figure 1C:
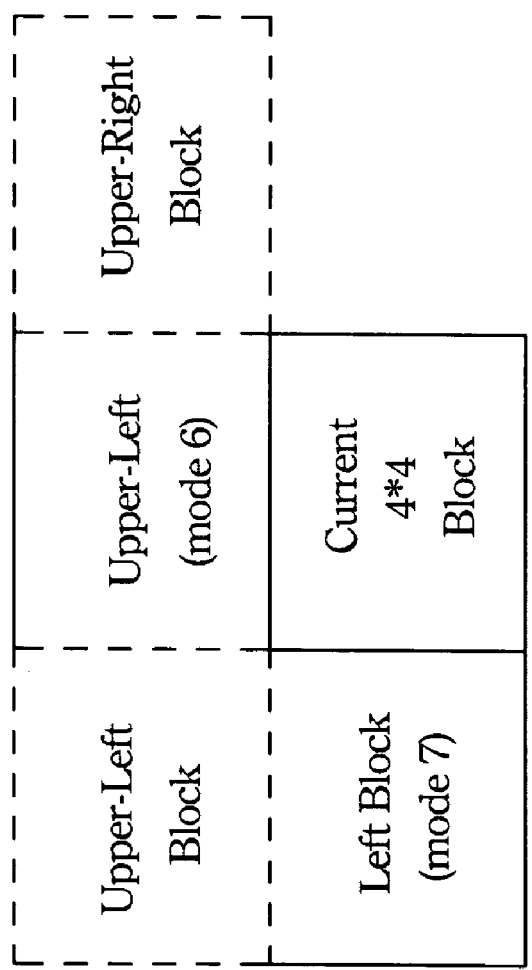

Reference is made to FIG. 1c, which illustrates a context-correlation search mode of the condition-correlation search mode.

In the second condition of the half-full search mode, when neither of the left and upper neighboring blocks is mode 2, the context-correlation search mode is performed. The prediction approach of context-correlation search mode is described as following: under the assumed condition when the prediction modes of two neighboring blocks are almost the same. In addition to original prediction modes of the upper and left blocks, other prediction modes similar to the upper and left blocks in spatial direction are also selected as the basis for prediction modes. In the motion vector and the context-correlation search table of FIG. 1c, the upper and left prediction modes are mode 6 and mode 7. Based on aforementioned approach, the prediction modes of mode 3, mode 7, mode 0 (from mode 7), mode 4, mode 6, mode 1 (from mode 6) and mode 2 (DC) are performed.

According to the above three search prediction modes, the condition correlation search mode, the half-full search mode and the context-correlation search mode, the I4MB mode determination table is provided in FIG. 2.

Reference is made to FIG. 3a and FIG. 3b, wherein FIG. 3a illustrates a luma 16×16 macroblock and FIG. 3b illustrates a 4×4 block of the intra 16×16 macroblock search algorithm of the intra 16×16 macroblock search algorithm of the preferred embodiment of the present invention.

The luma 16×16 macroblock is divided into sixteen 4×4 blocks. The 4×4 block denotes transformed residues that are computing the sum of absolute transformed difference (SATD) in FIG. 3b. The following Formula denotes the amount after accumulating from tr0 to tr15 in the FIG. 3b.

$$SATD_{4 \times 4blk} = \sum_{i}^{15} tr_i$$

The following formula is to accumulate the $SATD_{4 \times 4blk}$ of sixteen blocks, so the best I16MB prediction mode can be selected through the calculation result.

$$COST_{I16MB} = \sum_{4 \times 4blk=0}^{15} SATD_{4 \times 4blk}$$

Reference is made to the FIG. 4a and FIG. 4b, wherein FIG. 4a illustrates a U macroblock of the chroma macroblock, and FIG. 4b illustrates a V macroblock of the chroma macroblock.

There are U macroblock and V macroblock with four 4×4 blocks and four different kinds of chroma prediction modes in each color component. The spatial relation between the blocks in chroma prediction mode is not very obvious, and each predictor between the blocks is almost the same. Therefore, the following formula only calculates the SATD of top left block of the 4×4 block in each color component to perform the best prediction mode of chroma macroblock. This approach could greatly save 75% computation.

$$COST_{Chroma} = COST_u + COST_v$$
$$= SATD_{4 \times 4blk0} + SATD_{4 \times 4blk0}$$

According to the composition and the embodiments above, there are many advantages of the present invention, such as:

1. This invention proposes an effective fast method, which can simplify the processes determining the best luma and chroma prediction mode of H.264/AVC video compression standard, and further reduces the computation of system.

2. Compared to prior art, the simplified method of the present invention for luma and chroma prediction can not only speed up the whole system but also reduce system power consumption. Thus, the present invention can be implemented into chip and then applied to every kind of portable device such as multi-media mobile phone.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method using a chip for reducing computational complexity of video compression standard, at least comprising:
   providing an intra 4×4 macroblock search algorithm with a luma prediction mode by the chip, and the intra 4×4 macroblock search algorithm includes a condition-correlation search mode having a first upper block, a first left block, a half-full search mode, and a context-correlation search mode, and the intra 4×4 macroblock search algorithm has multiple prediction modes including a mode 0, a mode 1, a mode 2, a mode 3, a mode 4, a mode 5, a mode 6, a mode 7 and a mode 8;
   using the intra 4×4 macroblock search algorithm to determine a pre-determined prediction mode for computation based on the first upper block and the first left block by the chip;
   providing an intra 16×16 macroblock search algorithm with a luma prediction mode, and using the intra 16×16 macroblock search algorithm and the intra 4×4 macroblock search algorithm to accelerate the luma prediction modes of the intra 4×4 macroblock and the intra 16×16 macroblock by the chip;
   providing a chroma macroblock, including a U macroblock and a V macroblock by the chip; and
   using a chroma search algorithm to accelerate a plurality of chroma prediction modes of the U macroblock and the V macroblock by the chip;
   wherein the condition-correlation search mode includes a plurality of search conditions and comprises:
   performing only the mode 2 (DC) when the first upper block and the first left block are both non-available by the chip;
   performing the mode 1, the mode 2 and the mode 8 when the first upper block is non-available and the first left block is available by the chip;
   performing the mode 0, the mode 2, the mode 3 and the mode 7 when only the first upper block is available and the first left block is non-available by the chip; and
   using the half-full search mode and the context-correlation search mode when the first upper block and the first left block are both available by the chip.

2. The method for reducing the computational complexity of video compression standard of claim 1 wherein the half-full search mode includes a second upper block and a second left block.

3. The method for reducing the computational complexity of video compression standard of claim 2, wherein the half-full search mode includes a plurality of search conditions:
   performing the mode 0, the mode 1, the mode 2, the mode 3 and the mode 4 when the second upper block and the second left block are both mode 2 (DC) by the chip;
   performing the mode 0, the mode 1, the mode 2, the mode 3 and the mode 4 when the second upper block is mode 2 (DC) and the second left block is other prediction mode by the chip;
   performing the mode 0, the mode 1, the mode 2, the mode 3 and the mode 4 when the second upper block is other prediction mode and the second left block is mode 2 (DC) by the chip; and
   using the context-correlation search mode when the second upper block and the second left block are both other prediction mode by the chip.

4. The method for reducing the computational complexity of video compression standard of claim 3, wherein the context-correlation search mode includes a third upper block and a third left block.

5. The method for reducing the computational complexity of video compression standard of claim 4, comprising:
   performing at least one of the prediction modes by the context-correlation search mode wherein each of the performed at least one of the prediction modes corresponds to the third upper block and the third left block in spatial directions by the chip.

6. The method for reducing the computational complexity of video compression standard of claim 1, wherein the intra 16×16 macroblock search algorithm includes sixteen macroblocks, and each macroblock has sixteen transformed residues.

7. The method for reducing the computational complexity of video compression standard of claim 6, wherein the intra 16×16 macroblock search algorithm comprises:
   computing a distortion of each macroblock by a SATD (Sum of Absolute Transform Difference) by the chip;
   transforming the transformed residues by Hadamard by the chip; and
   summing up the absolute values of the transformed residues and computing the SATD of the sixteen macroblocks by the chip.

8. The method for reducing the computational complexity of video compression standard of claim 1, wherein the U macroblock includes four chroma prediction modes.

9. The method for reducing the computational complexity of video compression standard of claim 8, wherein the four chroma prediction modes are four 4×4 blocks.

10. The method for reducing the computational complexity of video compression standard of claim 9, wherein the U macroblock only computes a distortion of a left upper block as the distortion of the U macroblock by the chip.

11. The method for reducing the computational complexity of video compression standard of claim 1, wherein the V macroblock includes four chroma prediction modes.

12. The method for reducing the computational complexity of video compression standard of claim 11, wherein the four chroma prediction modes are four 4×4 blocks.

13. The method for reducing the computational complexity of video compression standard of claim 2, wherein the V macroblock only computes a distortion of a left upper block as the distortion of the V macroblock by the chip.

14. The method for reducing the computational complexity of video compression standard of claim 1, further comprising:
   computing a distortion of the U macroblock by the chip;
   computing a distortion of the V macroblock by the chip; and
   determining a distortion of the chroma macroblock by summing up the distortion of the U macroblock and the distortion of the V macroblock by the chip.

* * * * *